United States Patent [19]

Handtmann

[11] Patent Number: 5,445,745
[45] Date of Patent: Aug. 29, 1995

[54] FILTERING METHOD FOR FILTERING LIQUIDS

[76] Inventor: Thomas Handtmann, Hugo-Haring-Strasse-60, D-88396 Biberach, Germany, 88400

[21] Appl. No.: 170,304
[22] PCT Filed: Jun. 25, 1992
[86] PCT No.: PCT/EP92/01436
   § 371 Date: Feb. 7, 1994
   § 102(e) Date: Feb. 7, 1994
[87] PCT Pub. No.: WO93/00146
   PCT Pub. Date: Jan. 7, 1993

[30] Foreign Application Priority Data

Jun. 25, 1991 [DE] Germany .................. 41 20 971.0

[51] Int. Cl.⁶ ............................................. B01D 37/02
[52] U.S. Cl. ................................. 210/777; 210/193;
   210/143; 210/204; 210/230; 210/231; 210/284;
   210/335; 210/807
[58] Field of Search ............... 210/777, 778, 791, 193,
   210/807, 143, 739, 155, 204, 225, 230, 231, 284,
   391, 335, 407, 411, 346, 332

[56] References Cited

U.S. PATENT DOCUMENTS

| | | | |
|---|---|---|---|
| 3,578,163 | 5/1971 | Warning | 210/396 |
| 3,669,267 | 6/1972 | Hutton | 210/231 |
| 3,854,904 | 12/1974 | Jamet | 210/346 |
| 4,427,548 | 1/1984 | Quick, Jr. | 210/169 |
| 4,647,415 | 3/1987 | Schafft | 264/86 |
| 4,655,919 | 4/1987 | Schafft | 210/236 |
| 4,925,570 | 5/1990 | Schafft | 210/741 |
| 5,045,199 | 9/1991 | Fast et al. | 210/346 |

FOREIGN PATENT DOCUMENTS

| | | |
|---|---|---|
| 426545 | 2/1938 | Belgium . |
| 2546263 | 4/1977 | Germany . |
| 8403122 | 2/1986 | Germany . |
| 8438393 | 2/1986 | Germany . |
| 2201355 | 9/1988 | United Kingdom . |

*Primary Examiner*—Robert A. Dawson
*Assistant Examiner*—Robert James Popovics
*Attorney, Agent, or Firm*—Tilton, Fallon, Lungmus & Chestnut

[57] ABSTRACT

The present invention refers to filtering method and a filter device for filtering liquids, especially beverages. The filtering method and the filter device are to be reliable and simple without any negative influence on the quality of the filtrate. A filter is produced in a pre-coating station by precoating with a filter aid, the filters being then removed from the precoating station together with the filter carriers and introduced into a filtering station, where they are stacked up like a tower and pressed together.

8 Claims, 5 Drawing Sheets

FILTERING METHOD FOR FILTERING LIQUIDS

BACKGROUND AND SUMMARY

The present invention refers to a filtering method for filtering liquids, especially beverages, and a filter device for carrying out this method with the features according to the generic clauses of claim 1.

Such a filtering method is known in practice. It is especially used for sterile filtration in the beverage industry. When beer is being filtered, yeast cells and bacteria can be held back without preventing fine substances, which are responsible for the taste, from flowing through. Such a filtering method and such a filter device are known e.g. from EP-A-368 076.

In the case of this method, the filters are produced in a station outside of the filtering station. Subsequently, one filter at a time is inserted between two filter holders provided in the filtering station. The filter bowls with the filters are stacked up in the filtering station. This method is disadvantageous insofar as the filters have to have a high inherent stability so as to permit the transport of the filters into the filter bowls. For this purpose, a binding agent is admixed to the filter raw material. In view of the fact that such a binding agent contains sugar, its use has the disadvantage that sugar may penetrate into the liquid to be filtered. This can be prevented to a large extent by flushing the filtering station with water prior to starting the filtering process so as to dissolve the binding agent out of the filters. This may, however, have the effect that the height of the filters shrinks by approx. ⅓ at the most. This shrinkage will cause sealing problems in the filter device, and these sealing problems can only be solved by the use of special sealing means for sealing the filters in the filtering station. This makes the device complicated and expensive.

DE-A-39 00 934 discloses a filter device into which filters, which are produced without any binding agent, are inserted. The filters are produced in the filtering station itself by precoating with filter aids. The filter aid is, prior to starting the filtration process, supplied via a common supply line for precoating onto the individual filter holders, which are arranged one on top of the other in a towerlike configuration, so that the individual filters will be formed on said filter holders. When the filtering process has been finished, the filters will be washed out of the device by means of an appropriate rinsing agent.

This method is disadvantageous insofar as the structural design of the filter device is big and complicated because the filter aid is supplied via a common line for producing all filters in common. Hence, the supply line provided must have a sufficiently large diameter. Moreover, it is impossible to check the formation of the individual filters and their uniformity independently and exactly and to change it, if necessary. The fact that the filter aid is supplied via a common line and distributed over all filter carriers may result in an non-uniform formation of the filters. In view of the fact that the filters are not pressed, such non-uniformity will not be levelled out.

With respect to this prior art, it is the object of the present invention to provide an improved and simultaneously simplified filtering method and filter device for filtering liquids without exerting any negative influence on the quality of the filtrate.

In accordance with the present invention, this object is achieved by a filtering method having the features of claim 1.

In view of the fact that each filter is produced by precoating the filter aid onto a filter carrier in a precoating station, i.e. it is produced outside of the filtering station, the production of each individual filter can be supervised and controlled individually. This will guarantee the uniformity of the filters. The fact that production of the filters takes place in a precoating station also permits a simple structural design of the filter station, since it is not necessary to provide there any additional big channel for supplying the filter aid. It follows that it will suffice when the filter device is constructed such that it is suitable for carrying out the filtering process, and, consequently, it can be provided with the optimum structural design. The precoating method for producing individual filters outside of the filtering station can be used for producing simple filters as well as multi-layer filters, which have an asymmetrical structural design, in a reliable and controllable manner. For the purpose of supervision, a visual examination unit can be provided. When the precoating process has been finished, the filter can remain on the filter carrier in the precoating station so that it will dry.

In view of the fact that the filter carrier is introduced into the filtering station together with the filter produced thereon, the filter need not have any inherent stability for transporting the filter into a filter device. Hence, it is not necessary to use in the filter production process any binding agent whose sugar content has a disadvantageous influence on the taste of the filtrate. Furthermore, the above-mentioned problems, which arise with regard to the sealing means when the height of the filters shrinks due to the washing out of the binding agent, are eliminated, since the use of sealing rings becomes completely superfluous because the filter aid is directly precoated onto the filter carriers whereby the filter and the filter carriers will sealingly be connected to one another. In view of the fact that the individual filter carriers plus the filters located thereon are stacked directly one on top of the other in the filter device, each of the filter carriers placed on top of a filter carrier plus filter, which has already been introduced in the filtering station, will fully seal the lower filter when the filter plus filter carriers are pressed together. Depending on the filter material used, the pressing together can be limited by the filter carrier, when the filter material is particularly soft, or by the filter material itself in cases in which a strong filter material is used. Since no unhomogeneousness occurs, the pressing together will take place uniformly. The filter material will be fixed by the pressure applied.

Since the filter need not have any inherent stability for the purpose of transport, the filters produced can have a larger diameter than those produced by prior art methods. This will be advantageous when, for reason of space, the structural dimensions of the filter device should be not so high but comparatively broad.

In view of the fact that, after the end of the filtering process, the filter carriers plus the filters are removed from the filtering station one after the other, whereupon the filters are detached from the filter carriers in a disposal station for the purpose of disposal, the device can also be cleaned in a simple manner. It will just be necessary to remove the filter from each individual filter carrier. There is no necessity of providing cleaning possibilities in the filtering station itself. Nor does the filter device comprise any additional loose parts which would have to be cleaned individually as well. The filters can be separated from the respective filter carrier by knocking, pushing or shaking and disposed of in a disposal station. The disposal station need not necessarily be provided in the same place as the filter device. It may also be provided for several users, e.g. manufacturers of the filter carriers.

In accordance with an advantageous further development of the present invention, a discharge opening of the precoating line is arranged in the precoating station above the filter carrier. It will be advantageous when the discharge opening is located on the centre line through the filter carrier. This will guarantee uniform precoating of the filter aid onto the filter carrier. The uniform distribution of the filter material can be improved by arranging, above the filter carrier and below the discharge opening of the precoating line, a distributor element for distributing the filter aid on the filter carrier. An upwardly curved element, e.g. a convex metal sheet, can be used as a distributor element. The distributor element may also comprise a screenlike plate on which the material supplied for precoating spreads and is then uniformly transferred to the filter carrier via the holes in the plate.

In accordance with a further advantageous embodiment of the present invention, the precoating line is provided with discharge openings, which are arranged radially above an edge of the filter carrier. It will be advantageous to provide these discharge openings with radially arranged nozzles. Furthermore, it may be advantageous to provide the discharge openings with nozzles in such a way that the nozzles have an angle of inclination of from 20° to 70° relative to the radius. The filter aid is then blown with pressure onto the filter carrier, whereby the filter aid will uniformly be distributed on the filter carrier and a sealing contact will be established between the filter aid and the filter carrier. An even better uniformity of the filter material on the filter can be achieved when part of the nozzles defines said angle of inclination with the radius in the direction in which the hands of a clock rotate, whereas another part of the nozzles defines said angle of inclination with the radius in a direction opposite to that in which the hands of a clock rotate. The differently orientated nozzles can be arranged alternately one behind the other. It is also possible to arrange two differently orientated nozzles at approximately the same location one on top of the other, or to provide them as an integral component at a discharge opening.

The filter aid may consist of kieselguhr. Moreover, it may contain water so as to facilitate precoating. Furthermore, it may advantageous when the filter aid contains pearlite or fibres of plastic material or cellulose. The percentage of such fibres may typically be 5 to 20% of the filter aid material.

It can also be advantageous when the precoating station has arranged therein a pressure-exerting device for pressing the filter aid precoated on the filter carrier. By means of the pressing, an even more uniform production of the filter can be guaranteed.

Furthermore, it may be adavantageous when a plurality of precoating stations is provided, since this will speed up the production and the renewal of the filters. It will then also be possible to provide only one precoating line with several discharge openings in the respective precoating stations. It will also be advantageous when several filtering stations are provided. Part of the filtering stations can then, for example, be equipped with new filters while the filtering process is being carried out in the other filtering stations. Simultaneously, filters can be produced in the various precoating stations, said filters being supplied to the non-active filtering stations for replacing there the used filters.

It will also be advantageous when the filters are constructed as metal bowls. The filters can be produced uniformly on such metal bowls. The metal bowls have a long service life and they are easy to clean. Furthermore, the good thermal conductivity of these filter carriers guarantees fast heating of the filtering station, which is necessary for the purpose of sterilization before the filtering process is started.

The filter carriers may have a flat base. Furthermore, the base of the filter carriers may comprise a layer of a porous fabric. This fabric will retain the solid components in the filter and permit the filtrate to pass. It may also be advantageous to use at least one additional layer which consists of a porous fabric and whose pore size differs from that of the first layer. It may also be convenient when the filter carrier is provided with at least one sieve plate including longitudinal slots. In this respect, it will be particularly advantageous when the longitudinal slots have a width of from 0.01 to 0.5 mm. Such longitudinal slots can be formed in said plate either by means of a laser or by means of etching.

Moreover, it may be convenient when the filter carrier is provided with a bottom wall resembling a groove field. This bottom wall can be constructed such that the groove field forms discharge channels below the filter and below the porous fabrics. This will be advantageous in cases in which the filtering process is to be carried out from the top to the bottom and in which the filtrate should, consequently, be discharged below the filter. The groove field may, however, also be arranged in such a way that it forms channels above the filter and above the porous fabrics placed on top of the filter. This will be advantageous in cases in which the filtering process is to be carried out from the bottom to the top and in which the filtrate should, consequently, be discharged above the filter.

In accordance with an advantageous further development of the present invention, there is provided a filter carrier supply means, which supplies the individual filter carriers one after the other to the precoating station. The production of the filters can thus take place more rapidly and more simply, since it can be carried out automatically to a large extent.

Furthermore, it will be advantageous when a transport means is provided, which is used for removing the filter carrier with the filter located thereon from the precoating station as well as for transporting it to and inserting it into the filtering station. It will be convenient when the the transport means comprises a crane and a guide rail. The filter carrier coming from the precoating station can thus directly be installed in the filtering station simply and without difficulty. If the crane additionally comprises a control means with the aid of which the transfer of the filter carrier with the filter from the precoating station to the filtering station is effected automatically, the production of the filters up to the point where they are introduced in the filtering station can be carried out automatically, without any additional work on the part of an operator.

It may also be advantageous when the crane includes a protection box which is adapted to be closed and in which the filter carrier with the filter is enclosed while being transported from the precoating station to the filtering station. It can thus be avoided that the filters are exposed to the polluted atmospheric air during transport. This will increase the durability of the filters.

In accordance with an advantageous further development of the present invention, the filter carriers with the filters can be arranged one on top of the other in the filtering station in such a way that the filter carriers and the filters are axially symmetric with respect to an axis extending at right angles to the horizontal plane. This will be of advantage in cases in which filter carriers with a conical base are used, if said base is constructed with such an angle that oxygen, which is contained in the liquid to be filtered, can pass upwards and, consequently, escape from the device.

In accordance with an additional advantageous embodiment of the present invention, the filter carriers with the filters may be arranged one on top of the other in the filtering station in such a way that the filter carriers and the filter axes are symmetric with respect to an axis which is inclined relative to the horizontal plane. This will be convenient when filter carriers with a flat bottom are used, since the oxygen from the liquid to be filtered can then escape due to the angle of inclination of the bottom surface resulting from said inclination. It will be convenient when said axis is inclined by 30° relative to the plane. It may also be advantageous when the filtering station is adapted to be pivoted in such a way that the axis of symmetry which extends through the filter carriers and the filters can be varied. This permits the filter carriers plus the filters to be stacked up like a tower along the vertical axis of symmetry. When the filter carriers plus the filters have been stacked up like a tower and pressed together, the whole filtering station can be pivoted such that the desired angle of inclination will be obtained. It will then also be possible to correct this angle of inclination, if necessary.

It may just as well be advantageous to arrange the layers of fabric consisting of a porous material between the filters and the respective neighbouring filter carriers. This will have the effect that the layers of fabric need not be secured directly to the filter carriers and that hey can be varied, if necessary.

Furthermore, it may be advantageous when the filtering station has provided therein a backwashing means. With the aid of the backwashing, intermediate cleaning of the filters is effected, whereby the service life of the filters in the filtering station can be extended. It may also be convenient to provide in the filtering station a plurality of flexible hose lines for discharging the filtrate, since the discharge of the filtrate and the filtering process will then take place in a particularly uniform manner.

In accordance with an additional advantageous further development of the present invention, a lifting means can be provided for removing the filter carrier plus the filter associated therewith and for transporting them to the emptying station. This lifting means may comprise a lifting crane. Also the removal of the filter carriers plus the filters as well as the removal of the filters from the filter carriers will thus take place automatically. The filters can be removed by pressing or knocking by means of a slidable element or by a shaking movement. If the disposal container is movable, the used filter material can be removed directly from the emptying station.

According to an additional advantageous further development of the present invention, a cleaning station may be provided in which the filter carriers are cleaned after removal of the filters in the emptying station. The cleaning can be effected e.g. by compressed air or superheated steam. It will also be advantageous when a cleaning transport means is provided, the filter carriers being, after removal of the filters, transferred to said cleaning transport means so that they can be transported through the cleaning system. If the filter carrier supply means additionally extends from the cleaning station to the precoating station, it will be possible to resupply the filter carriers directly to the precoating station after having removed therefrom the filter material and after having them sent through the cleaning station; in said precoating station, the next precoating process can then be started, if necessary.

It will also be of advantage when a superior control electronics and a data processing unit are provided, since the whole filtering process, which comprises the steps of supplying the filter carriers to the precoating station, precoating the filter aid onto the filter carriers, installing the filters with the filter carriers in the filtering station, starting the filtering process, removing the filter carriers and the filters, cleaning the filter carriers and resupplying them to the precoating station, can then be carried out fully automatically.

BRIEF DESCRIPTION OF THE DRAWINGS

In the following, the present invention will be described in detail on the basis of the drawing, in which.

DESCRIPTION OF THE PREFERRED EMBODIMENTS

Figure 1:
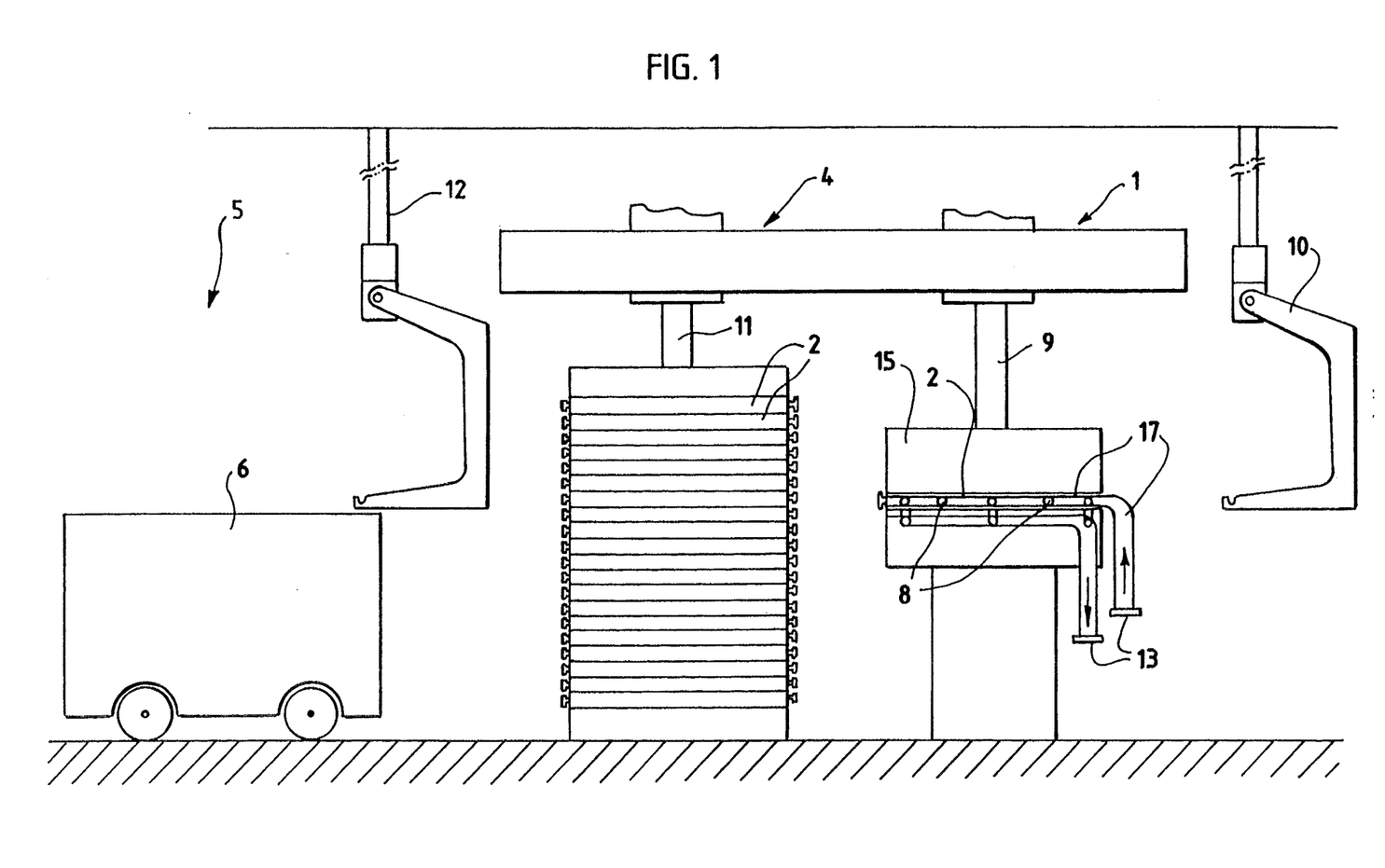
FIG. 1 shows a schematic representation of a filter device according to the present invention.

FIG. 1 shows a schematic representation of a filter device according to the present invention, which is used for filtering liquids, especially beverages. A filter carrier 2 is arranged in a precoating station 1, a filter 3 being produced on said filter carrier 2. Furthermore, a filtering station is provided, which has inserted therein the filter carrier 2 together with the filter 3. The filtering process takes place in said filtering station. After the end of the filtering process, the filter carriers 2 with the filters 3 are removed from the filtering station 4. In a disposal station 5, the filters 3 are detached from the filter carriers 2 and placed in a disposal container 6.

The precoating station 1 has arranged therein a filter carrier 2 in a precoating device 15. A precoating line 7 extends in the interior of the precoating device 15 above the filter carrier 2 and along the diameter thereof. The precoating line 7 has provided therein radial openings 8 which are distributed over the circumference of the filter carrier 2. A filter aid is supplied for precoating onto the filter carrier 2 via the precoating line 7 and the openings 8. The openings 8 can be provided with nozzles through which the filter aid is applied with overpressure to the filter carrier 2 radially or at an angle of inclination of from 20 to 70°. On the basis of the arrangement of the nozzles, whose angles of inclination with respect to the radius can be arranged alternately clockwise and anticlockwise, a uniform application of the filter aid onto the filter carrier 2 is achieved. In view of the fact that the filter aid is applied with overpressure, the filter 3 is in sealing contact with the filter carrier 2. By means of a pressure-exerting device 9, the precoating device 15 is pressed against the filter carrier 2 during the precoating process and removed from said filter carrier 2 when the precoating process has been finished. The filter aid comprises a mixture of kieselguhr and water; it may also comprise pearlites and up to 5 to 20% fibres of plastic material or cellulose. Furthermore, the precoating device 15 has provided therein a discharge conduit 13 through which the liquid contained in the filter aid can be discharged while the filter 3 is being formed on the filter carrier 2. The liquid contained in the filter aid flows through a screenlike bottom of the filter carrier 2 into the discharge conduit 13.

When the production of the filter 3 on the filter carrier 2 has been finished, the filter carrier 2 and the filter 3 are jointly removed from the precoating station 1 and transferred to the filtering station 4. The filter carrier 2 and the filter 3 are jointly introduced into the filtering station in such a way that the filter carriers 2 with the filters 3 are stacked up like a tower. The filter carriers 2 with the filters 3 are pressed together in the filtering station 4 with the aid of a pressure means 11. The filter carriers 2 with the filters 3 then lie on top of one another in such a way that they mutually seal each other. Channels for supplying the liquid to be filtered and discharge means for the filtrate are provided, the filtering process being carried out via said channels and discharge means. In view of the fact that the filters 3 are produced directly on the filter carriers 2 and introduced into the filtering station 4 together with said filter carriers 2, no binding agent is necessary for producing the filters 3, since said filters 3 need not be transported individually. It is thus avoided that sugar, which is contained in the binding agent, passes into the beverage. The fact that the filters 3 are produced individually in the precoating station 1 permits a uniform production of the filters 3, since the production of each filter 3 can be watched, supervised and controlled individually. For the purpose of checking, a visual examination means can be provided at the precoating station 1.

Figure 2:
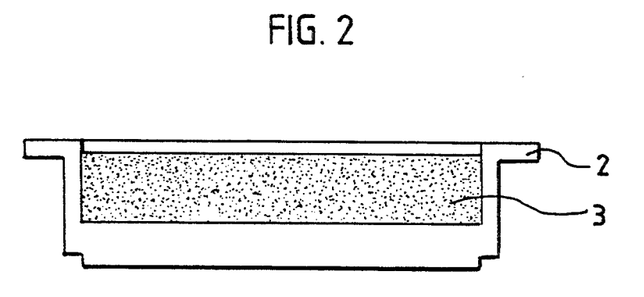
FIG. 2 shows a schematic representation of a first embodiment of a filter carrier according to the present invention.

The filter carriers 2 preferably consist of metal bowls. One embodiment having a flat bottom is shown in FIG. 2. In the filtering station 4, the filter carriers 2 with the filters 3 are arranged one on top of the other in such a way that the filter carriers 2 and the filters 3 are axially symmetric with respect to an axis extending at right angles to the horizontal plane.

For the purpose of removing the filter carriers 2 with the filters 3 from the filtering station 4, a lifting crane 12 is provided. Said lifting crane is used for removing the filter carriers 2 with the filters 3 from the filtering station 4. The filters 3 are detached from the filter carriers 2 in the disposal station 5. A disposal container 6, which receives therein the used filters 3 and transports them away, is provided in the disposal station 5.

A more detailed embodiment of a filter carrier according to the present invention will be explained hereinbelow on the basis of FIG. 3.

The filter carrier 2 consists of a carrier made of metal or plastic material and, at the bottom thereof, it is provided with a base 16 constructed as a pressure piece, a circumferentially extending scraper ring 17 being provided on the lower edge of said base 16. When viewed in plan, the filter carrier has a circular shape.

On a support plate 19, the filtrate collecting channel 20 extends, said filtrate collecting channel 20 opening into a circumferentially extending annular collecting channel 21. The collecting channel 20 is delimited at the top thereof by a filter medium carrier 18, e.g. in the form of a wire screen. The filtrate is removed via the filtrate discharge means 22.

In the upper area of the filter carrier 2, an inlet connection piece 23 for the liquid to be filtered can be seen. At the opposite side of the drawing, a holding means 24 for a locking hook 25 is shown, said locking hook 25 being acted upon by a spring 26 which urges it into the position shown and being supported such that it is adapted to be pivoted about the shaft 27. Below the inlet connection piece 23 for the liquid to be filtered, the drawing shows a valve 28 provided with a valve tappet 30 which is acted upon by a spring 29 such that it is urged into its closed position.

Above the circumferentially extending scraper ring 17, supply openings 31 are shown, which open into a distributing chamber 32 for the liquid to be filtered.

Figure 3:
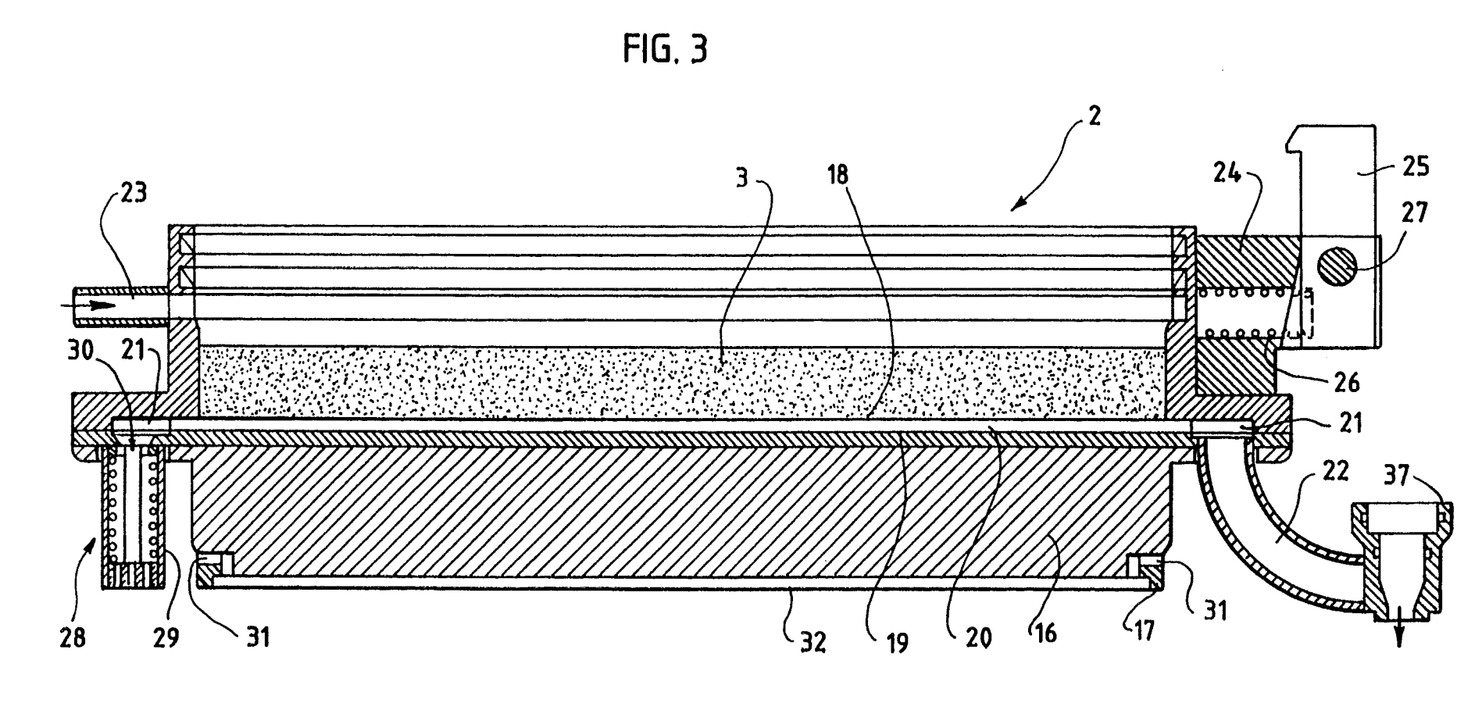
FIG. 3 shows a sectional view of a filter carrier according to the present invention.
Figure 4:
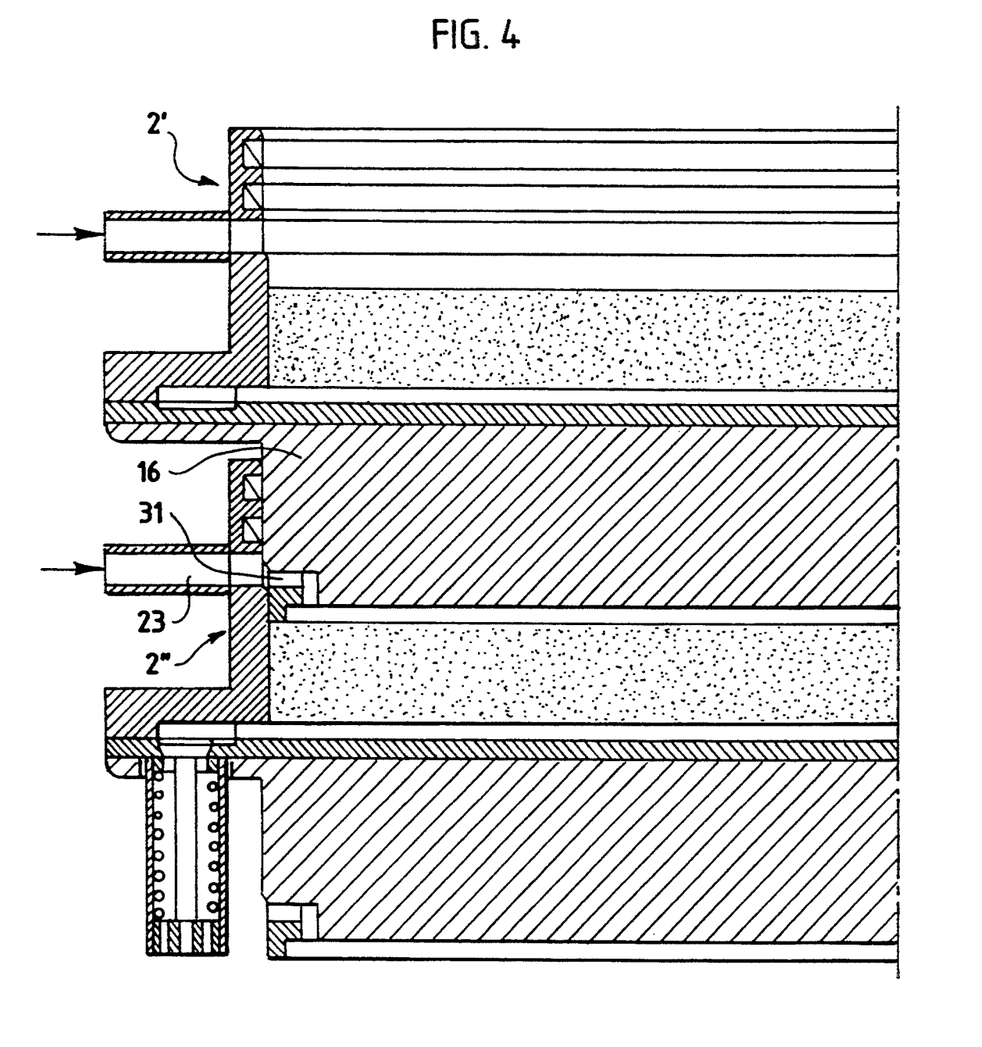
FIG. 4 and 5 show a representation of a detail of two superimposed filter carriers having the structural design which is shown in FIG. 3.

FIG. 3 and 4 show how two filter carriers 2, which have the above-described structural design and which are placed one on top of the other in the filter device, cooperate in the area of the locking hooks 25 as well as in the area of the inlet connections 23 for the liquid to be filtered.

The drawing shows that the pressure piece 16 of the upper filter carrier 2' engages from above the filter carrier 2" positioned below said filter carrier 2', and that in the position shown in FIG. 4 said pressure piece 16 has its supply opening 31 brought into alignment with the inlet connection piece 23 for the liquid to be filtered. Hence, the liquid to be filtered can flow into the filter carrier 2" via this inlet connection piece and the supply opening 31.

As can be seen from the drawing, the filter carriers are, at the opposite side, hooked together by engagement of the locking hook 25 with a projection 33. A plurality of locking hooks as well as a plurality of inlet and outlet connection pieces may be arranged such that they are distributed over the circumference.

The circumferentially extending double sealing means 34 and 35 seal the pressure piece 16 of the upper element with respect to the upper wall of the lower element 2". The liquid to be filtered coming from the connection piece 23 is distributed via the annular channel 36 at the periphery of the element and can then flow into the element 2" via the supply openings 31.

The filtrate can then be removed at 22 via the annular collecting channel 21.

With the aid of the function of the valve 28, it is possible to keep the cross-section of the discharge from the filter carrier small during the filtering process because in the closed condition (cf. FIG. 3) the discharge cross-section is determined by the filtrate discharge connection piece 22 alone. For the precoating process, which necessitates the use of larger amounts of water, the valve can, however, be opened so that a larger flow cross-section will be obtained. The check valve 28 can be releasable mechanically, and this can be effected by an adequate stud, which is not shown, when the filter carrier 2 is introduced in the precoating station in its accurate position. During the filtering process, these valves 28 represent static sealing means so that no special flushing chambers will be necessary for these valves. In the case of smaller units, the valves may also be replaced by stoppers. The opening and closing can be carried out manually or with the aid of screws.

The flat scraper ring 17 provided between the pressure piece 16 (lower base of the filter carrier 2) and the cylindrical wall of a filter carrier positioned below said filter carrier 2 is able to prevent reliably that filter aids, such as kieselguhr, are washed away. Moreover, this sealing means 17 prevents kieselguhr particles from getting stuck between the wall and the pressure piece.

The double sealing means 34 and 35 provide between them a flushable space, which can be adapted to be flushed via flushing conduits, which are not shown in detail.

For supplying and discharging the liquid to be filtered, channel eyes 37 may be provided at the inlet 23 for the liquid to be filtered and at the filtrate discharge means 22, said channel eyes 37 being shown in FIG. 3 only at the filtrate discharge means. When several filter carriers are stacked one on top of the other, these channel eyes will form continuous supply and discharge passages, respectively.

The locking of the individual filter carriers 2 offers the advantage that, also in a stacked filter carrier tower, specific filter carriers can be removed from said tower by lifting the upper filter carriers with the aid of a suitable lifting device, the number of filter carriers entrained corresponding to the number of filter carrier locking hooks which are in engagement. The filter carrier to be removed can then be disengaged by unlocking from the upper element and by releasing the locking connection with the lower element, and, consequently, it can be removed separately. It is thus also possible to examine the elements one after the other from the top to the bottom and vice versa, without there being any necessity of providing a temporary place of deposit for the elements, since each element can be inspected freely by lifting the interconnected elements which are positioned on top of the element in question.

Figure 5:
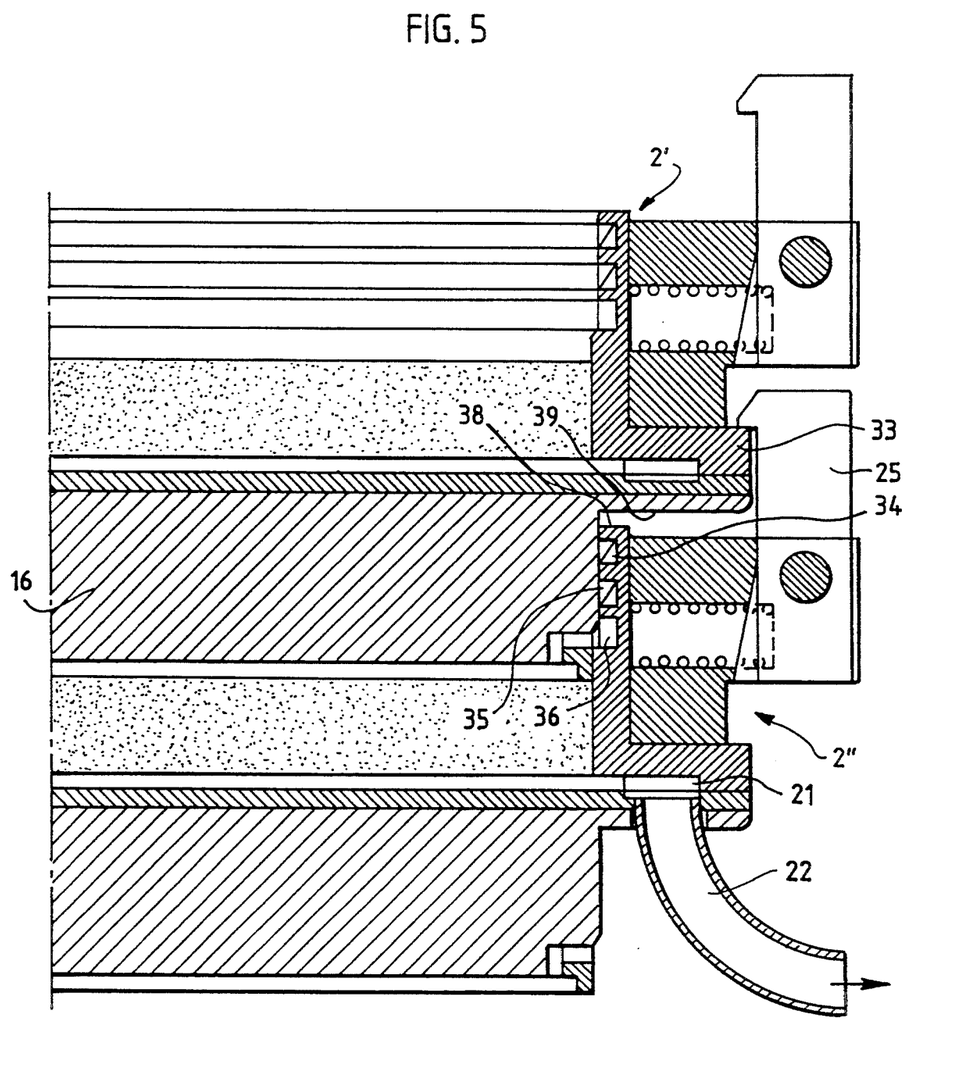

As can be seen in the drawing, there is, in the condition shown in FIG. 4 and 5, an interval between the upper edge 38 and the oppositely located stop means 39 of an element positioned above said upper edge 38. The filter elements can be urged towards one another by a distance corresponding to this interval, and, in the course of this movement, the pressure piece 16 of an upper element will uniformly apply pressure to the filter cake positioned below said pressure piece.

The elements plus a pressure plate (for the uppermost filter cake) may be clamped together so as to form packages. Up to a diameter of 80 cm, the packages can thus be dispatched on Europallets. This also permits a central precoating with new filter aids for a plurality of breweries as well as a common disposal or reprocessing of the filters. Packaging material will not be necessary in this case.

In the following, the method according to the present invention will be explained. A filter carrier 2 is supplied to the precoating station 1 with the aid of a filter carrier means, which is not shown. In said precoating station, the filter carrier 2 is arranged below the precoating line 7. A filter aid is supplied with overpressure via the precoating line 7 and is then distributed uniformly over the filter carrier 2 via nozzles arranged at discharge openings 8. The water contained in the filter aid flows off via the discharge conduit 13. Due to the strong pressure drop occurring when the filter aid is discharged from the nozzles, a filter 3 will be formed on the filter carrier 2, said filter 3 being in sealing contact with said filter carrier 2. The valve 28 is open during this process.

Subsequently, the filter carrier 2 plus the filter 3 are removed from the precoating station by means of the crane 10 and introduced into the filtering station 4. There the filter carriers 2 with the filters 3 are stacked up like a tower and pressed together with the aid of a pressure means 11.

This pressing together can also be effected hydraulically from below, and, for this purpose, pure water hydraulics may be used, this being advantageous for reasons of environmental protection. Now the liquid to be filtered will be supplied and the filtrate will be discharged in the manner described with respect to FIG. 3 and 4.

When the filtration process has been finished, the pressure means 11 will be opened.

The filter carriers 2 with the filters 3 are removed by means of a lifting crane 12 and supplied to a disposal station 5. There the filters 3 are detached from the filter carriers 2. The used filter material is transferred to the disposal container 6. Subsequently, the filter carriers 2 are supplied to a cleaning station, which is not shown in the drawing, where they are cleaned by means of a steam jet and transferred to the filter carrier supply means with the aid of which the filter carriers 2 are resupplied to the precoating station.

The precoating station need not necessarily be provided at the same location as the filter device. It is just as well imaginable to perform the precoating centrally for a plurality of users and to effect there also a common disposal or reprocessing of the filter aids.

I claim:

1. A process for filtering liquids comprising the steps of:

depositing a filtration aid on substantially flat filter carriers (2) to form filters (3) on the filter carriers (2) at a depositation station (1) without adding binding agents to the filtration aid or filters (3);

then, removing the filter carriers (2) and the deposited filters (3) from the depositation station (1);

then, introducing the filter carriers (2) and the deposited filters (3) into a filter station (4) and stacking them in a vertical tower;

then, pressing the stacked filter carriers (2) and filters (3) together;

thereafter, supplying a liquid to be filtered to the filters (3) which are on the filter carriers (2) in the filter station (4), wherein said liquid flows through an inlet in a sidewall of a respective carrier above the filter, through the filter, and out through an outlet in a sidewall of said respective carrier below the filter; and then, removing a filtrate from the filter station (4).

2. The process of claim 1 comprising the further steps of:

after removing the filtrate from the filter station (4), successively removing the filter carriers (2) and filters (3) from the filter station (4);

then, releasing the filters (3) from the filter carriers (2) in a disposal station (5) for disposal of the filters (3); and thereafter, cleaning the filter carriers (2).

3. The process of claim 1 comprising the further preliminary step of successively feeding a plurality of the filter carriers (2) to the depositation station (1).

4. The process of claim 1 in which the step of depositing the filtration aid on the filter carriers (2) includes distributing the filtration aid evenly over a circumference or perimeter of the filter carriers (2).

5. The process of claim 1 in which the step of depositing the filtration aid on the filter carriers (2) includes depositing the filtration aid from a position vertically above the filtration carriers (2).

6. The process of claim 1 in which the step of depositing the filtration aid on the filter carriers (2) comprises depositing the filtration aid onto a central portion of the filter carriers (2).

7. The process of claim 1 in which the step of depositing the filtration aid on the filter carriers (2) comprises depositing the filtration aid radially over an edge of the filter carriers (2).

8. The process of claim 1 in which said process is controlled automatically.

* * * * *